U S010032436B2

(12) United States Patent
Lee

(10) Patent No.: US 10,032,436 B2
(45) Date of Patent: Jul. 24, 2018

(54) DISPLAY DEVICE HAVING MULTIPLE DISPLAY MODES AND IMAGE DISPLAYING METHOD THEREOF

(75) Inventor: Junghyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 259 days.

(21) Appl. No.: 13/604,068

(22) Filed: Sep. 5, 2012

(65) Prior Publication Data

US 2013/0086528 A1    Apr. 4, 2013

(30) Foreign Application Priority Data

Sep. 29, 2011  (KR) .................. 10-2011-0098729

(51) Int. Cl.
*G06F 3/048* (2013.01)
*B60K 35/00* (2006.01)
*G09G 5/14* (2006.01)
*G06F 3/14* (2006.01)

(52) U.S. Cl.
CPC .............. *G09G 5/14* (2013.01); *G06F 3/1454* (2013.01); *G09G 2340/045* (2013.01); *G09G 2354/00* (2013.01); *G09G 2370/22* (2013.01)

(58) Field of Classification Search
CPC ......... G06Q 30/00; G06F 3/00; G06F 1/1639; G06F 3/1415; G06F 21/73; B60K 35/00
USPC ........ 715/838, 718, 798, 764; 345/173, 169; 345/536; 709/204, 205; 705/14.99
See application file for complete search history.

(56) References Cited

U.S. PATENT DOCUMENTS

| | | | | |
|---|---|---|---|---|
| 5,935,247 A | * | 8/1999 | Pai ........................ | G06F 21/73 726/29 |
| 6,593,975 B1 | * | 7/2003 | Oh ............................... | 348/730 |
| 6,922,718 B2 | * | 7/2005 | Chang .......................... | 709/204 |
| 7,058,901 B1 | * | 6/2006 | Hafey et al. ................. | 715/792 |
| 7,310,087 B2 | * | 12/2007 | Ha ............................... | 345/169 |
| 7,405,723 B2 | * | 7/2008 | Kang et al. .................. | 345/156 |
| 7,426,735 B2 | * | 9/2008 | Bliss et al. .................. | 719/310 |
| 7,523,402 B2 | * | 4/2009 | Kunisada ..................... | 715/761 |
| 8,434,019 B2 | * | 4/2013 | Nelson ......................... | 715/798 |
| 2002/0054207 A1 | * | 5/2002 | Iizuka ................... | G09G 3/003 348/54 |
| 2004/0012620 A1 | * | 1/2004 | Buhler et al. ................ | 345/716 |
| 2004/0030986 A1 | * | 2/2004 | Matsuda ...................... | 715/500 |
| 2004/0211282 A1 | * | 10/2004 | Kim ...................... | B60K 35/00 74/473.3 |
| 2005/0046747 A1 | * | 3/2005 | Park ..................... | G09G 5/003 348/569 |

(Continued)

FOREIGN PATENT DOCUMENTS

KR    10-2005-0115148    12/2005

OTHER PUBLICATIONS

Korean Office Action dated Nov. 27, 2017 issued in Application No. 10-2011-0098729.

*Primary Examiner* — Jennifer To
*Assistant Examiner* — Jasmine Wan
(74) *Attorney, Agent, or Firm* — KED & Associates, LLP

(57) ABSTRACT

Provided is an image displaying method of a display device. In the image displaying method, a menu screen is displayed, an image output mode is set on the menu screen, code information corresponding to the set image output mode is transmitted to a computer main body, an image corresponding to the set image output mode is received from the computer main body, and the received image is displayed.

12 Claims, 8 Drawing Sheets

(56) References Cited

U.S. PATENT DOCUMENTS

| | | | |
|---|---|---|---|
| 2005/0066286 A1* | 3/2005 | Makela | G06F 3/04817 |
| | | | 715/764 |
| 2005/0114231 A1* | 5/2005 | Kinjo | 705/27 |
| 2005/0270277 A1* | 12/2005 | Park | 345/173 |
| 2006/0010385 A1* | 1/2006 | Sasaki | 715/718 |
| 2006/0050044 A1* | 3/2006 | Ikeda | 345/98 |
| 2006/0092187 A1* | 5/2006 | Wang | G09G 5/005 |
| | | | 345/698 |
| 2008/0270899 A1* | 10/2008 | Duncan | 715/700 |
| 2009/0300541 A1 | 12/2009 | Nelson | |
| 2011/0018818 A1* | 1/2011 | Iwano | 345/173 |
| 2011/0090234 A1* | 4/2011 | Bolcsfoldi et al. | 345/536 |
| 2011/0106615 A1* | 5/2011 | Churchill et al. | 705/14.49 |
| 2011/0173644 A1* | 7/2011 | Teng | G06F 3/1415 |
| | | | 719/329 |
| 2012/0166993 A1* | 6/2012 | Anderson | G06F 1/1639 |
| | | | 715/771 |

\* cited by examiner

FIG.8
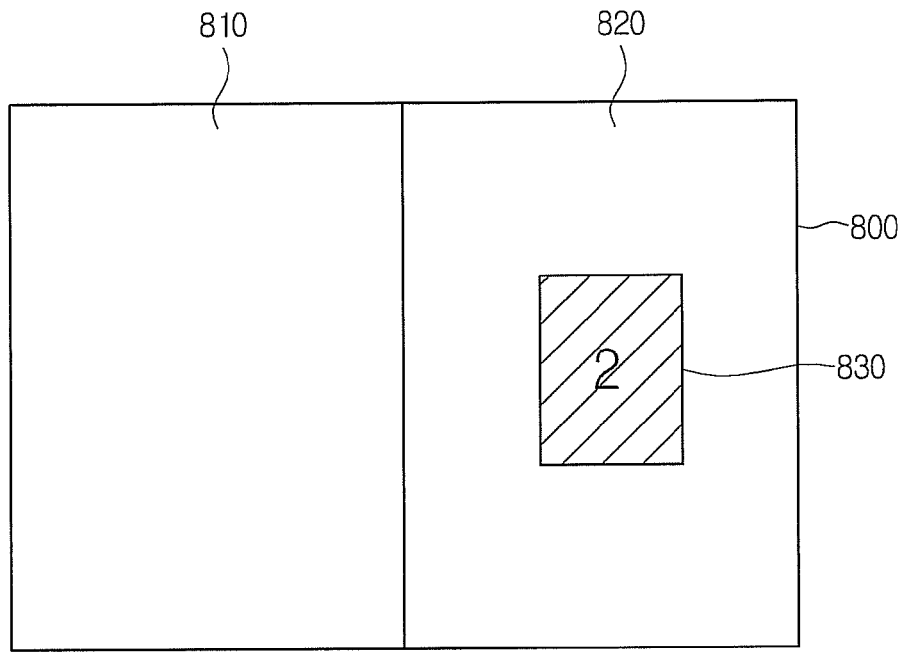
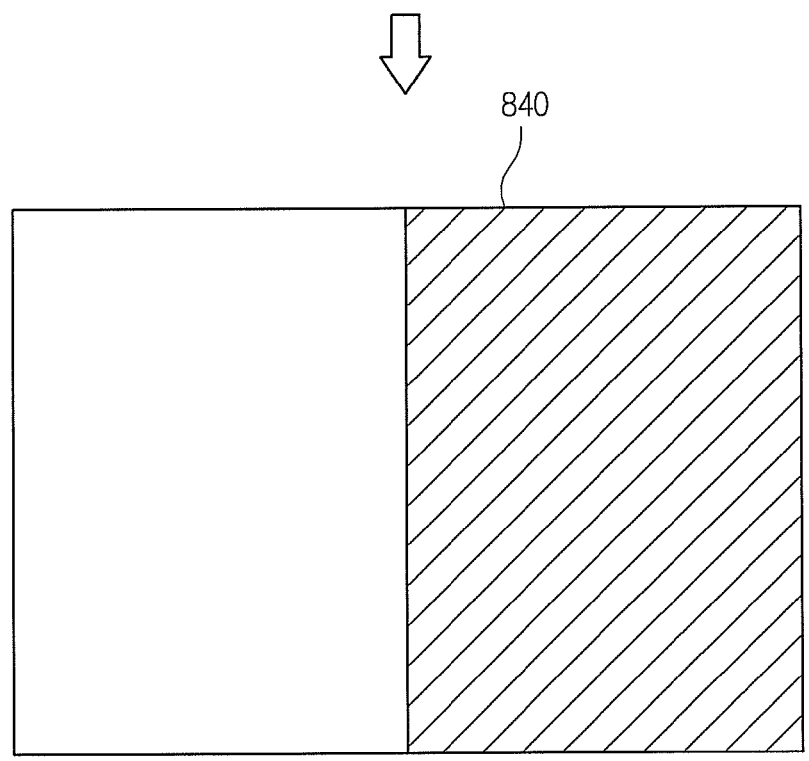

DISPLAY DEVICE HAVING MULTIPLE DISPLAY MODES AND IMAGE DISPLAYING METHOD THEREOF

CROSS-REFERENCE TO RELATED APPLICATIONS

The present application claims priority under 35 U.S.C. 119 and 35 U.S.C. 365 to Korean Patent Application No. 10-2011-0098729 (Sep. 29, 2011), which is hereby incorporated by reference in its entirety.

BACKGROUND

The present disclosure relates to a display device, and more particularly, to a display device receiving an image from a computer main body, and an image displaying method of the display device.

In general, a display device displays an image on a screen by processing a specifically formatted image signal transmitted from a video card of a computer connected to the display device, through a series of signal processes such as digital sampling and scaling.

That is, a computer system includes a computer main body providing an image signal, and a display device displaying an image according to an image signal transmitted from the computer main body.

In particular, a dual display device includes a plurality of display devices to use a plurality of image signals output from a computer main body. In this case, the image signals are output to thereby display images on the display devices, so that a computer user can carry out a multi tasking process such as simultaneous comparison, analysis, input, or edit of a plurality of documents. Thus, dual display devices are increasingly being used.

To set a typical dual display device, a dual display mode is set using a mouse or keyboard connected to a computer main body, whereby the computer main body transmits image signals corresponding to the set dual display mode, to display devices.

However, such a dual display mode can be set using only a mouse or keyboard connected to a computer main body. Thus, it may be difficult for unskilled users to set a dual display mode.

SUMMARY

Embodiments provide a display device that can set a dual display mode.

In one embodiment, an image displaying method of a display device includes: displaying a menu screen; setting an image output mode on the menu screen; transmitting code information corresponding to the set image output mode, to a computer main body; receiving an image corresponding to the set image output mode, from the computer main body; and displaying the received image.

In another embodiment, a display device includes: an input part on which an image output mode is set; a display part displaying a menu screen on which the image output mode is set; a storage part storing code information corresponding to the image output mode set on the menu screen; a control part controlling the menu screen to be displayed, and transmitting the code information corresponding to the image output mode set on the displayed menu screen, to a computer main body; and a communication part transmitting the code information to the computer main body according to a control signal from the control part, and receiving an image transmitted from the computer main body, according to the transmitted code information.

The details of one or more embodiments are set forth in the accompanying drawings and the description below. Other features will be apparent from the description and drawings, and from the claims.

BRIEF DESCRIPTION OF THE DRAWINGS

FIGS. 7 and 8 are schematic views illustrating images displayed according to another embodiment.

DETAILED DESCRIPTION OF THE EMBODIMENTS

Terms used in the following description and scopes of claims are not limited to terms that have been in dictionaries, and are used only for explaining specific exemplary embodiments while not limiting the present invention.

Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
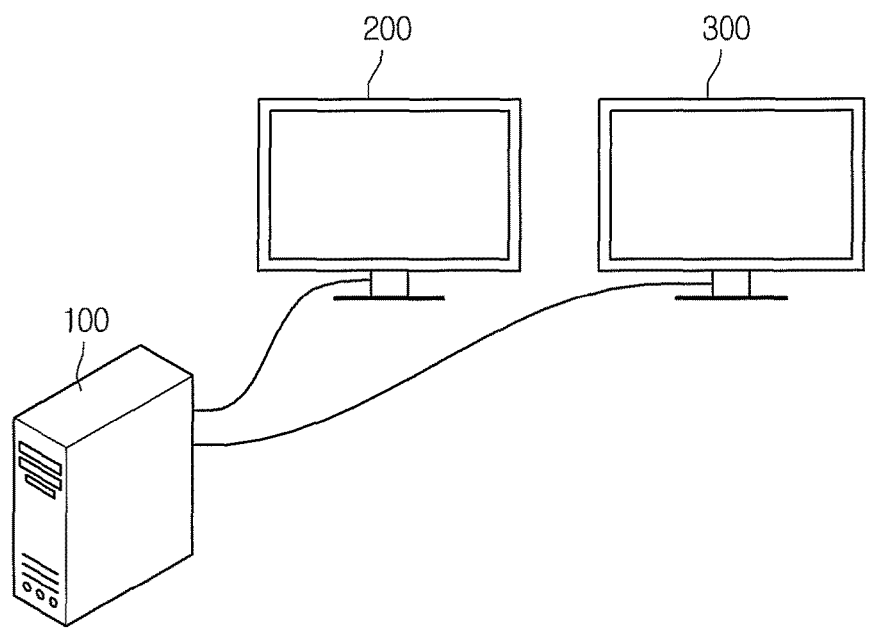
FIG. 1 is a schematic view illustrating a display system including a dual monitor according to an embodiment.

FIG. 1 is a schematic view illustrating a display system including a dual monitor according to an embodiment.

Referring to FIG. 1, a display system according to the current embodiment includes a computer main body 100, a first display device 200, and a second display device 300. The computer main body 100 transmits an image signal and a control signal according to an order input through a user interface, and the first and second display devices 200 and 300 are connected to the computer main body 100 and display an image signal according to a control signal transmitted from the computer main body 100.

Particularly, in a method of setting an image output mode of the display system, such an image output mode can be set using an input part provided in the first and second display devices 200 and 300, without using a mouse or keyboard connected to the computer main body 100.

Figure 2:
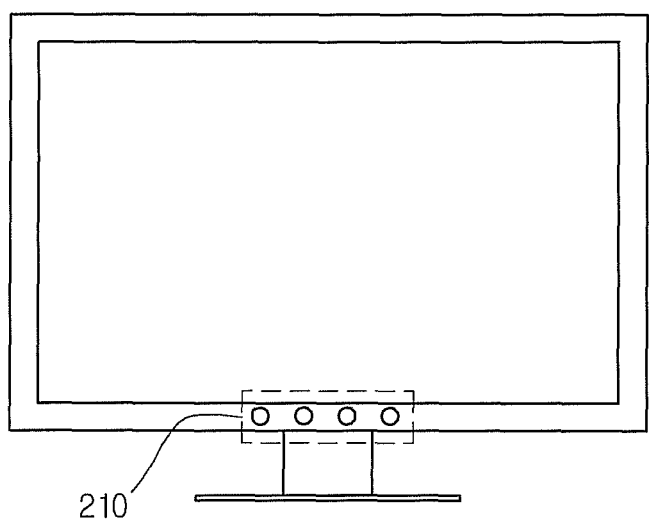
FIG. 2 is a front view illustrating a display device according to another embodiment.

FIG. 2 is a front view illustrating a display device according to an embodiment.

Referring to FIG. 2, an input part 210 is disposed in a portion of the first display device 200 to control an operation of the first display device 200.

The input part 210 may include a power menu item for controlling power to the first display device 200, and a menu item for setting an image output mode of the first display device 200.

In particular, the input part 210 includes a menu item connected to the computer main body 100 to set an output mode (e.g., a dual display mode or a dual web mode) of an image transmitted through the computer main body 100.

That is, in the related art, a dual display mode or a dual web mode cannot be set using a display device and can be set using a mouse or keyboard connected through a computer main body. In other words, a dual display mode or a dual web mode can be set only via a computer main body.

However, according to the current embodiment, an image output mode of the computer main body 100 can be set using the input part 210 of the first display device 200.

Figure 3:
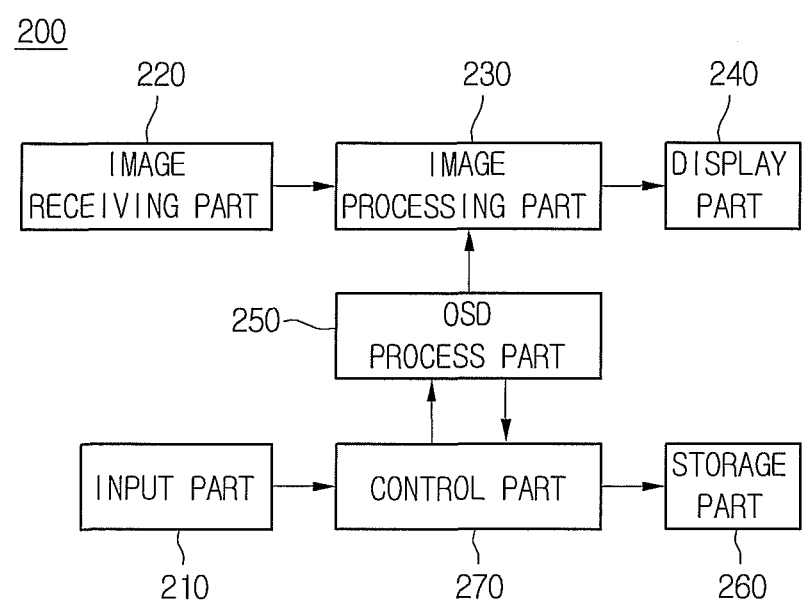
FIG. 3 is a block diagram illustrating a display device according to another embodiment.

FIG. 3 is a block diagram illustrating a display device according to an embodiment.

Referring to FIG. 3, the first display device 200 includes an input part 210, an image receiving part 220, an image processing part 230, a display part 240, an on screen display (OSD) process part 250, a storage part 260, and a control part 270.

A request order is input to the input part 210 from a user. The input part 210 may be a local key input part disposed in a portion of the first display device 200 as illustrated in FIG. 2. Alternatively, the input part 210 may be a touch screen.

The image receiving part 220 is connected to the computer main body 100 through a cable to receive an image transmitted from the computer main body 100.

The image processing part 230 decodes an image received through the image receiving part 220, and signal-processes the decoded image to be output to the display part 240.

The image, signal-processed by the image processing part 230, is displayed by the display part 240. For example, the display part 240 may include one of various display devices such as a liquid crystal display (LCD), a plasma display panel (PDP), an electro luminescent display (ELD), and a vacuum fluorescent display (VFD), to display an image.

The OSD process part 250 generates a menu screen in an OSD manner, to set at least one viewing environment according to a control signal from the control part 270 to be described later.

The storage part 260 stores information generated while the display device is operated, or information required to operate the display device. For example, the storage part 260 may be embodied as an electrically erasable programmable read-only memory (EEPROM).

Particularly, the storage part 260 stores code information defined between the computer main body 100 and the first display device 200.

Typically, a display device operates by receiving only control signals transmitted from a computer main body. However, according to the current embodiment, standardized code information is defined between the first display device 200 and the computer main body 100, and the first display device 200 communicates with the computer main body 100 by using the defined standardized code information.

The control part 270 controls the overall operation of the first display device 200.

In particular, when an order for setting an image output mode is input to the input part 210, the control part 270 controls the OSD process part 250 to generate a menu screen for setting the image output mode.

After that, when a specific menu item is selected on the generated menu screen, the control part 270 extracts code information, corresponding to the selected specific menu item, from the storage part 260 and transmits the extracted code information to the computer main body 100.

At this point, the extracted code information is transmitted through the cable connected between the image receiving part 220 and the computer main body 100.

TABLE 1

| MODE | OP CODE | VALUE |
|---|---|---|
| DUAL DISPLAY | 0×E3 | 0: OFF |
| | | 1: EXTENSION |
| | | 2: CLONE |
| | | 3: DPM |
| | | 4: INITIALIZATION |
| DUAL WEB | 0×E1 | 1: ON |
| | | 2: OFF |

That is, referring to Table 1, the menu screen includes menu items related to a dual display mode, and menu items related to a dual web mode.

The menu items related to the dual display mode include: a first menu item for turning the dual display mode off; a second menu item for setting the dual display mode to an extension mode; a third menu item for setting the dual display mode to a clone mode; a fourth menu item for performing a display power management (DPM) mode; and a fifth menu item for performing an initialization mode.

The menu items related to the dual web mode include: a sixth menu item for turning the dual web mode off; and a seventh menu item for turning the dual web mode on.

Thus, when a specific menu item is selected on the menu screen, the controller part 270 extracts code information corresponding to the selected specific menu item, and transmits the extracted code information to the computer main body 100.

When specific code information is transmitted from the first display device 200 to the computer main body 100, the computer main body 100 sets an image output mode corresponding to the specific code information, and transmits an image to the first display device 200 according to the set image output mode.

Hereinafter, an image displaying method according to an embodiment will be described in more detail with reference to the accompanying drawings.

Figure 4:
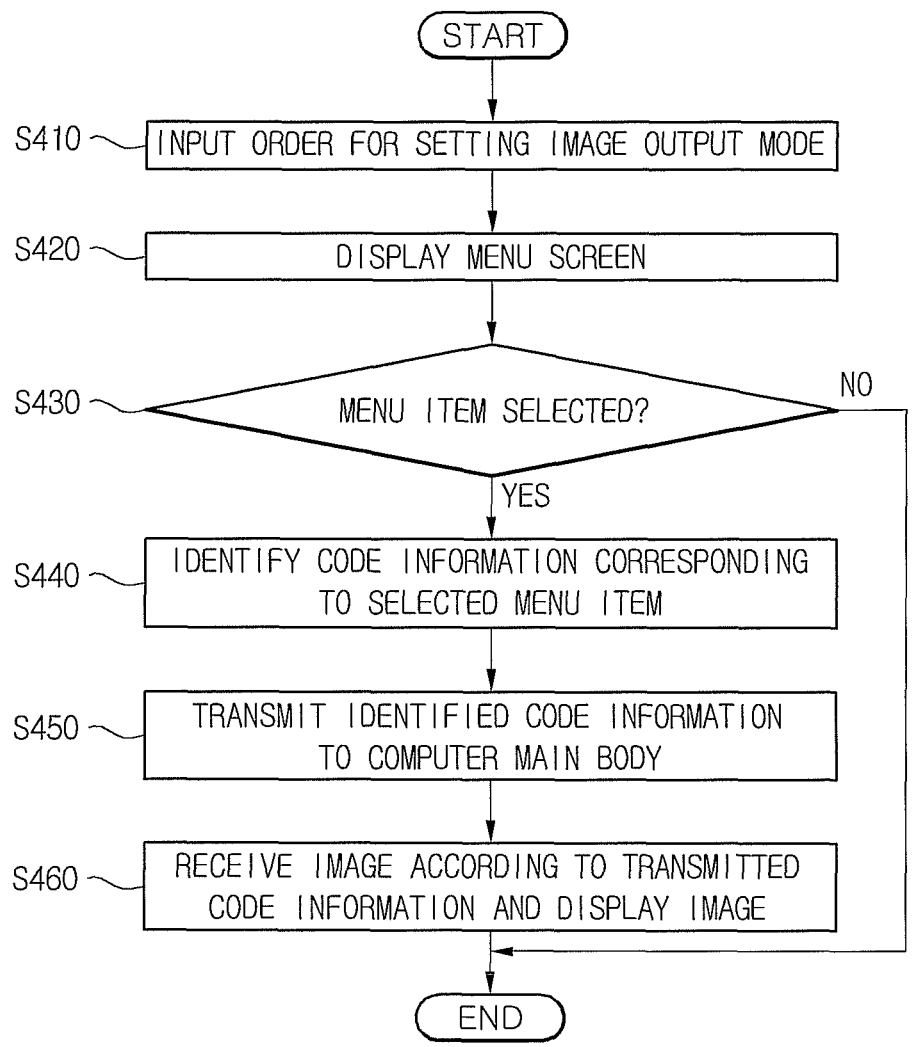
FIG. 4 is a flowchart illustrating an image displaying method of a display device according to another embodiment.
Figure 5:
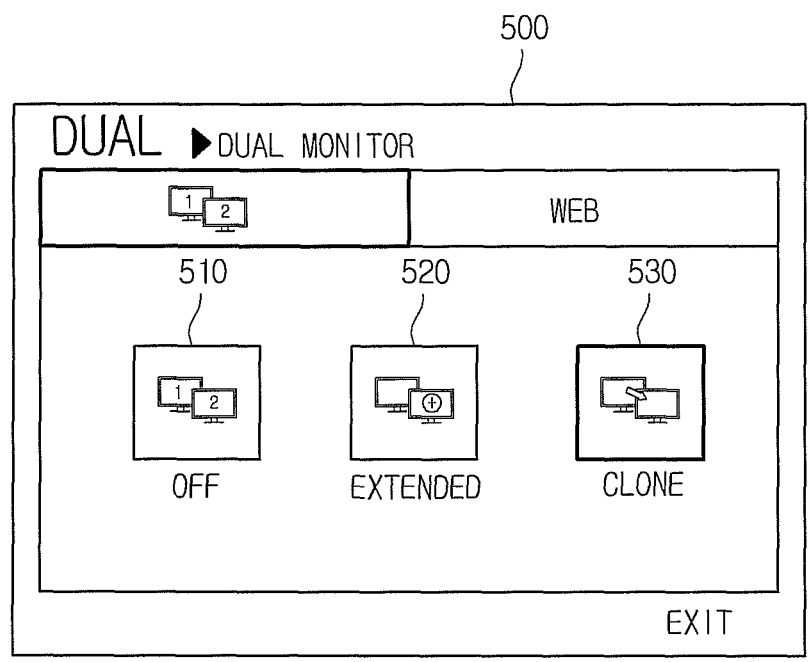
FIGS. 5 and 6 are schematic views illustrating a menu screen displayed according to another embodiment.
Figure 6:
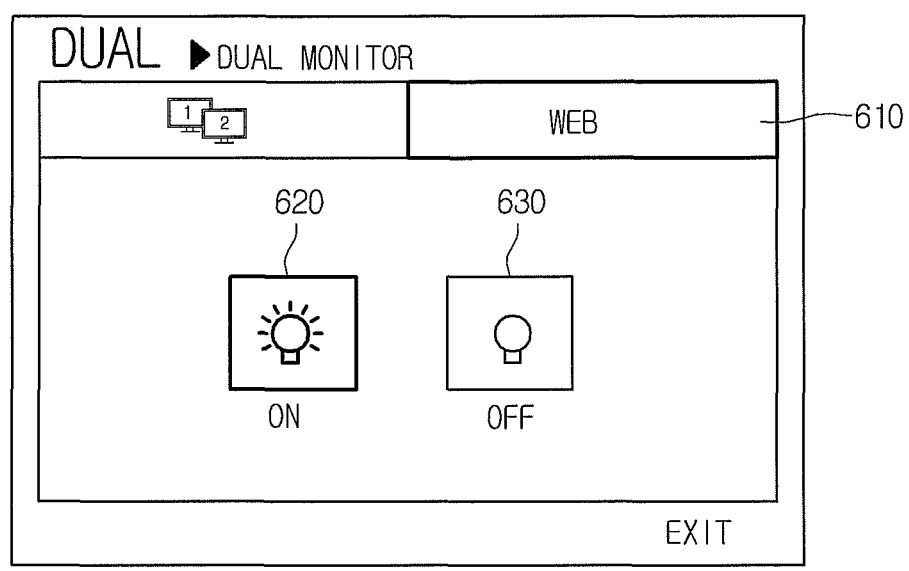
Figure 7:
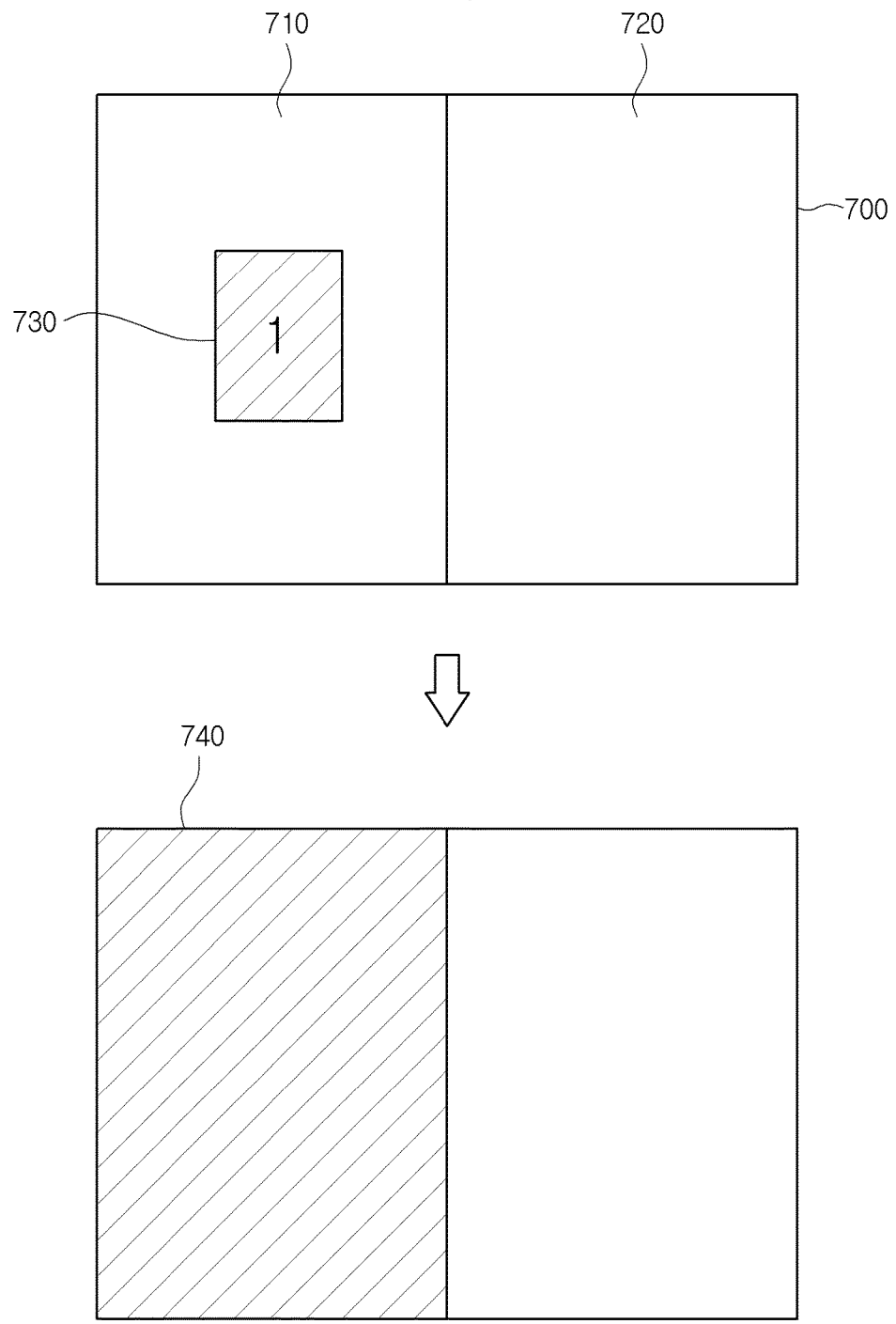

FIG. 4 is a flowchart illustrating an image displaying method of a display device according to an embodiment. FIGS. 5 and 6 are schematic views illustrating a menu screen displayed according to the current embodiment. FIGS. 7 and 8 are schematic views illustrating images displayed according to the current embodiment.

Referring to FIG. 4, in operation S410, an order for setting an image output mode is input to the input part 210 from a user, and the input part 210 transmits information to the control part 270 according to the input order.

In operation S420, the control part 270 controls, according to the transmitted information, the OSD process part 250 to generate a menu screen for setting the image output mode, and the generated menu screen is displayed on the display part 240.

Referring to FIGS. 5 and 6, the menu screen includes a menu item 500 related to a dual display mode, and a menu item 610 related to a dual web mode.

The menu item 500 related to the dual display mode includes: a first menu item 510 for turning the dual display mode off; a second menu item 520 for setting the dual display mode to an extension mode; and a third menu item 530 for setting the dual display mode to a clone mode. Further, the menu item 500 may include: a fourth menu item for performing a display power management (DPM) mode; and a fifth menu item for performing an initialization operation.

The menu item 610 related to the dual web mode includes: a sixth menu item 620 for turning the dual web mode off; and a seventh menu item 630 for turning the dual web mode on.

In operation S430, the control part 270 determines whether a specific menu item is selected on the displayed menu screen.

If a specific menu item is selected, the control part 270 identifies code information corresponding to the selected specific menu item in operation S440. That is, the control part 270 extracts the code information corresponding to the selected specific menu item, from the storage part 260.

Then, the control part 270 transmits the extracted code information to the computer main body 100 in operation S450.

In operation S460, the control part 270 receives an image corresponding to the set image output mode according to the transmitted code information, and displays the image.

That is, referring to FIG. 7, when the dual web mode is set, the control part 270 divides a display screen 700 into a first region 710 and a second region 720. When an image 730 is transmitted from the computer main body 100, the image 730 is displayed on the first region 710. After that, when a full screen display order is input, an image 740 as a full screen of the image 730 is displayed on the entire area of the first region 710, not on the entire area of the display screen 700.

Referring to FIG. 8, when an image 830 is additionally transmitted from the computer main body 100, the image 830 is displayed on the second region 820. After that, an image 840 as a full screen of the image 830 is displayed on the entire area of the second region 820 according to a full screen display order.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image displaying method of a display device, comprising:
    receiving a selection of a local key disposed in a portion of the display device or a touch input on a touch screen of the display device, the selection being received by a controller on the display device;
    in response to receiving the selection, displaying a menu screen including a dual display mode menu item for setting a dual display mode and a dual web mode menu item for setting a dual web mode, wherein the menu screen is displayed by the controller in the display device;
    receiving a selection of the dual display mode or the dual web mode on the menu screen using at least one input received on the menu screen through the local key or the touch screen;
    extracting, by the controller in the display device, dual display mode code information or dual web mode code information from a storage device included in the display device based on the at least one input, wherein the dual display mode code information and the dual web mode code information are standardized code information defined between the display device and the computer for setting different display modes, wherein the dual display mode is to display a first image on the display device and a second image on another display which is a display device different than the display device, and the dual web mode is to split the display screen into two regions in which the two regions respectively displays two different images;
    transmitting the extracted code information to the computer through a cable connected between the display device and the computer so that the display mode is set at the computer according to the extracted code information;
    receiving at least one first image from the computer in accordance with the transmitted dual display mode code information or at least one second image from the computer in accordance with the transmitted dual web mode code information; and
    displaying the received at least one first image in accordance with the set dual display mode or the received at least one second image in accordance with the set dual web mode.

2. The image displaying method according to claim 1, wherein the dual display mode menu item includes a first menu item for turning the dual display mode off, a second menu item for setting the dual display mode to an extension mode, and a third menu item for setting the dual display mode to a clone mode.

3. The image displaying method according to claim 2, wherein the dual display mode code information includes first code information defined for the first menu item, second code information defined for the second menu item, and third code information defined for the third menu item.

4. The image displaying method according to claim 1, wherein the menu screen includes a fourth menu item for performing or ending a display power management (DPM) mode, and the dual display mode code information includes fourth code information defined for the fourth menu item.

5. The image displaying method according to claim 1, wherein the menu screen includes a fifth menu item for performing an initialization operation, and the dual display mode code information includes fifth code information defined for the fifth menu item.

6. The image displaying method according to claim 1, wherein the displaying of the received image includes:
    dividing a display screen into a plurality of regions;
    receiving a plurality of images from the computer; and
    displaying the received images on the regions of the display screen, respectively.

7. The image displaying method according to claim 6, wherein the display screen receives division information of the images received from the computer, and the display screen is divided into the regions to correspond to the received division information.

8. A display device comprising:
    an input device including at least one of a touch input device or a local key disposed in a portion of the display device;
    a display that displays, in response to a selection of the at least one of the touch input device or the local key, a menu screen including a dual display mode menu item for setting a dual display mode and a dual web mode menu item for setting the dual web mode, the menu screen being generated locally in the display device;
    an input device that receives at least one input to set a dual display mode or a dual web mode, the at least one input being received at the display device without using a mouse or keyboard controlled at a computer;

a storage device that stores dual display mode code information, wherein the dual display mode code information is standardized code information defined between the display device and the computer for setting the dual display mode, and storing dual web mode code information, wherein the dual web mode code information is standardized code information defined between the display device and the computer for setting the dual web mode, wherein the dual display mode is to display a first image on the display device and a second image on another display which is a display device different than the display device, and the dual web mode is to split the display screen into two regions in which the two regions respectively displays two different images;

a controller that extracts the dual display mode code information or the dual web mode code information from the storage device on the display device based on the at least one input, controls the communication device to transmit the extracted code information, and controls the display to display the received at least one first image in accordance with the set dual display mode and to display the received at least one second image in accordance with the set dual web mode, wherein the dual display mode code information or the dual web mode code information is transmitted through a cable connected between the communication device and the computer.

9. The display device according to claim 8, wherein the dual display mode menu item includes a first menu item for turning the dual display mode off, a second menu item for setting the dual display mode to an extension mode, and a third menu item for setting the dual display mode to a clone mode, and the dual display mode code information comprises first code information defined for the first menu item, second code information defined for the second menu item, and third code information defined for the third menu item.

10. The display device according to claim 8, wherein the menu screen includes a fourth menu item for performing or ending a display power management (DPM) mode, and the dual display mode code information includes fourth code information defined for the fourth menu item.

11. The display device according to claim 8, wherein the menu screen includes a fifth menu item for performing an initialization operation, and the dual display mode code information includes fifth code information defined for the fifth menu item.

12. The display device according to claim 8, wherein the controller divides a display screen into a plurality of regions according to selection of the dual web mode, and displays images transmitted from the computer according to the division of the display screen, on the regions of the display screen, respectively.

* * * * *